May 23, 1961  A. M. CHABOTTE  2,984,862
MOLDING APPARATUS
Filed Jan. 9, 1957   2 Sheets-Sheet 1
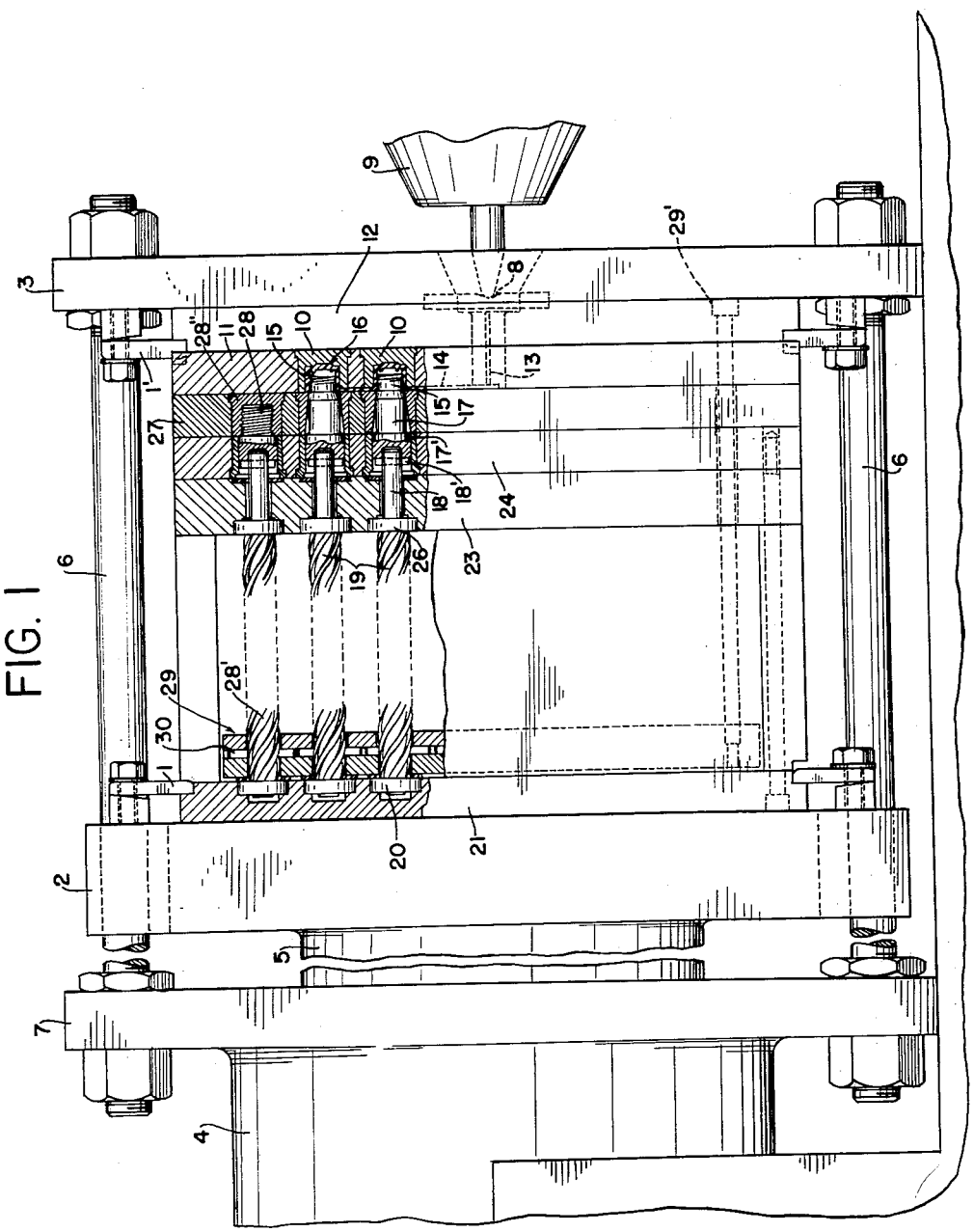
INVENTOR
ALFRED M. CHABOTTE
BY
Pennie, Edmonds, Morton, Barrows & Taylor
ATTORNEYS

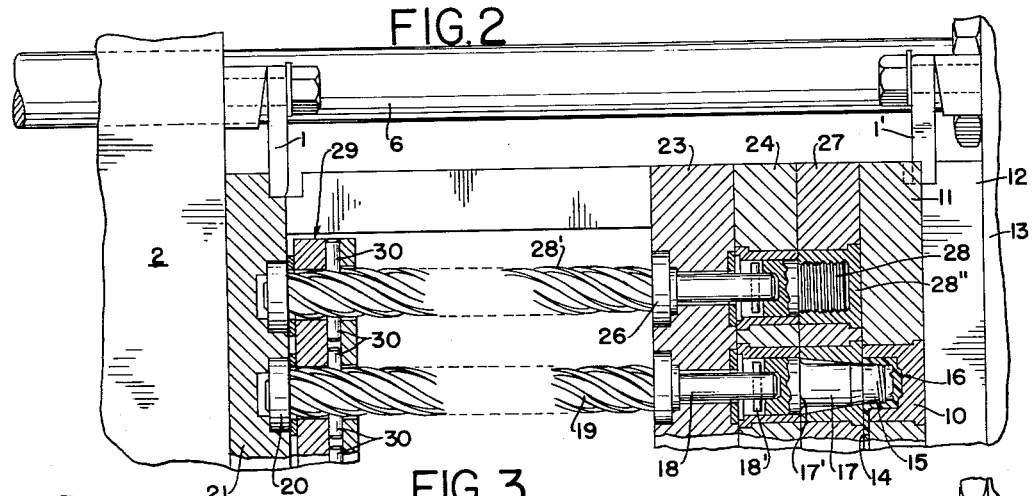
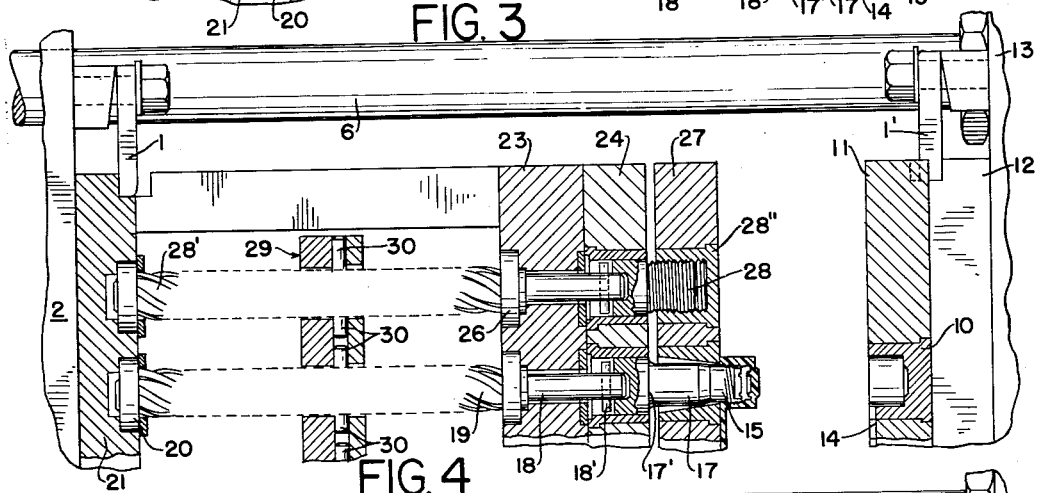
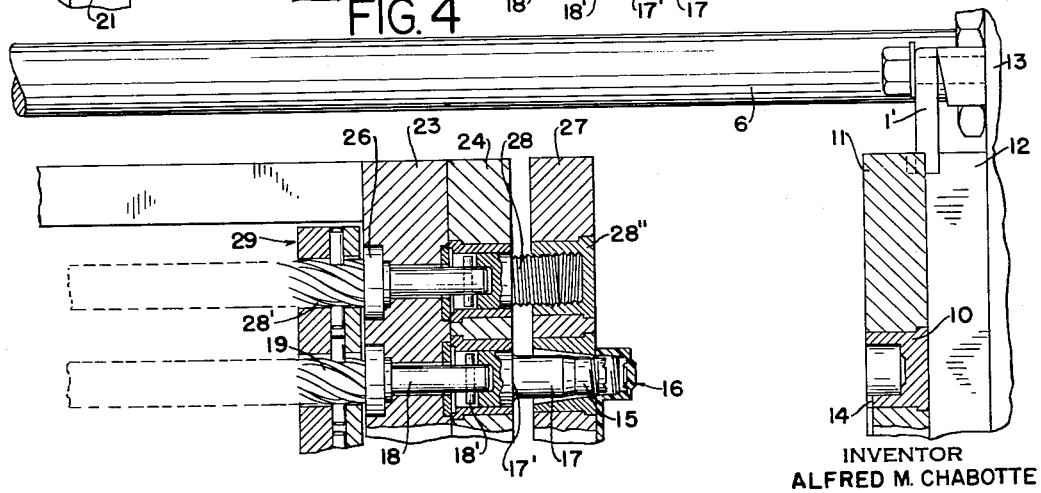

United States Patent Office 2,984,862
Patented May 23, 1961

2,984,862
MOLDING APPARATUS

Alfred M. Chabotte, Norwich, Conn., assignor to Plastene Corporation, Crawfordsville, Ind., a corporation of Indiana Filed Jan. 9, 1957, Ser. No. 633,365

9 Claims. (Cl. 18—2)

This invention relates to molding apparatus and especially to such apparatus for manufacturing internally threaded plastic articles. More particularly, the invention is concerned with improved means for removing the molded articles from the threaded male molds subsequent to molding.

Injection molding machines are especially suitable for the manufacture of low cost plastic articles because of the high output capacity attainable from their rapid production cycles. However, if an internal thread is to be molded into the article the frequency of the production cycle is appreciably lowered by the time required to unscrew the article from the threaded male mold after molding.

Attempts have been made in the past to incorporate various automatic unscrewing devices into such machines in order to shorten the production cycle, but the results have not been completely favorable. Known unscrewing means are invariably of complex design and hence are not commensurate on a cost basis with the extremely high-volume, low-cost articles being produced. Moreover, such unscrewing devices generally incorporate relatively bulky electrically or hydraulically operated spur gear or rack and pinion gear actuating means, which, by their very size, restrict the number of cavities which might be placed in a mold frame. Generally the old devices are each designed as an integral operative sub-assembly of the molding machine itself and cannot be removed or interchanged for use with other machines. Without involved retooling, an injection machine so equipped is often restricted to production of internally threaded articles exclusively, and as a result its valuable flexibility is lost.

In an endeavor to improve over the known unscrewing means the apparatus of the present invention was conceived. Of major significance is the relative simplicity of the apparatus which of course means both lower initial cost and reduced danger of malfunctioning during operation. Furthermore, it has been designed as an integral part of the mold unit itself rather than as a permanent part of the entire molding machine, and since the mold unit and incorporated unscrewing device are quite interchangeable, the flexibility of the overall machine is in no way diminished.

In addition, the operative cycle of the apparatus of the present invention is dependent solely upon the normal cyclic movement of the movable platen of the injection molding machine, without resorting to independent means to impart motion to the male mold. Means have been incorporated into the apparatus to restrain the molded article from rotating as the male mold is unscrewed, sole reliance for this purpose not being placed on the weak gate and sprue connected to the freshly molded article. Substantially identical actuating means cause the male mold to rotate and the restraining means to operate, thus facilitating interchangeability of a majority of parts.

The mold unit is adapted to be removably mounted between the stationary and movable platens of a standard injection molding machine. Though it may be used in either vertical or horizontal units, the preferred embodiment herein described is shown arranged in a horizontal machine. The stationary female molds are formed in a plate of the mold unit adapted to be secured to the stationary platen and are interconnected by gates and sprue therein with the injection means and cooperate with corresponding male molds to form cavities therebetween of the shape of the desired internally threaded articles. The male molds extend from coaxial, shaft-like members rotatably mounted on a plate of the mold unit adapted to be secured to the movable platen of the molding machine, and helical threads of relatively large lead are formed on the cylindrical surfaces of these members. These threaded shaft-like members extend through and are in threaded cooperation with another plate of the mold unit which remains stationary and induces rotation of the shaft-like members when the movable platen is translated. This motion unscrews the male molds from the internally threaded articles. Jack-screws which are mounted on similar shaft-like members are likewise rotated during this same operation and these members maintain a restraining plate in abutment with the articles during unscrewing of the male molds.

A preferred embodiment of the apparatus is described below with reference to the accompanying drawings, wherein, Fig. 1 is an elevation, partly in section, of the molding unit of this invention mounted in a conventional horizontal injection molding machine;

Fig. 2 is a partial sectional elevation of the apparatus of Fig. 1 showing one complete male and female mold combination and a jack-screw in closed position conditions;

Fig. 3 illustrates the same in open position with the male mold and attached cap partly retracted from the female mold; and Fig. 4 illustrates the same in open position with the cap completely threaded off the male mold.

In Fig. 1 the apparatus of this invention is shown operatively positioned in the press section of a conventional horizontal injection molding machine, between the movable platen 2 and the stationary platen 3 thereof, by means of bolt and clamp assemblies 1 and 1'. The injection molding machine illustrated in Fig. 1 comprises, in addition, a piston 5 cooperating with a hydraulic cylinder 4 broken away in the drawing. Movable platen 2 is affixed to piston 5 and is adapted to be translated along tie rods 6 in sliding engagemnt therewith. Tie rods 6 extend longitudinally from flange 7 secured to hydraulic cylinder 4 and rigidly connect stationary platen 3 thereto. A seat 8 is centrally located on stationary platen 3 to receive the retractable nozzle 9 of the plastic injection means and heating cylinder.

A plurality of female molds 10 are located in plate 11 which is fixedly secured by means not shown to mounting plate 12. Bolt and clamp assemblies 1' secure mounting plate 12 and plate 11 to the face of stationary platen 3. A sprue 13 is directed horizontally from nozzle 9, through plates 11 and 12, and connects with a system of runners 14 leading to each mold 10 along the face of plate 11. A plurality of threaded male molds 15 corresponding in number and cooperating with the female molds 10 define cavities 16 in the shape of the desired internally threaded caps. Each male mold 15 includes an integral mold head 17 mounted upon the extremity of a rigid shaft-like assembly consisting of a shaft 18 integrally extending from a helix 19. The end portion of mold head 17 is shouldered at 17' and shaft 18 is secured thereto by a pin 18' passing through shaft 18 into slots in shoulder 17'. These shaft-like members extend horizontally through a tier of vertical plates connected by bolt and clamp assemblies 1 to movable platen 2.

The opposite extremities of helices 19 are rotatably mounted in a plurality of corresponding bearings 20 located in plate 21 adjoining the face of movable platen 2. The extremities of helices 19 adjacent mold heads 17 are rotatably mounted in bearings 26 in a bearing plate 23 which is removably bolted to plate 24.

Shaft sections 18 are journaled within bearing 26 and extend therethrough into plate 24 where they are secured to the mold heads 17 by pins 18'. Each mold head 17 is directed through restraining plate 27 which is positioned between and adjoins plates 24 and 11 when the mold is in closed position as illustrated in Fig. 1. Restraining plate 27 is translatably mounted upon a number of pins and bushings extending from plate 24, but is supported primarily by a plurality of jack-screws 28 (one shown) located on the extremities of shaft-like members 28', which are identical with those extending from mold heads 17 and are similarly mounted; the jack-screws threadably engage nuts 28" (one shown) secured in restraining plate 27. The threads on jack-screws 28 are of the same direction and pitch as those on the male molds 15 which form the internal threads on the plastic caps. In the preferred design of this invention there have been arbitrarily incorporated sixty-four molds and eight jack-screws, and these have been arranged symmetrically about the center line of the machine. The jack-screws and mold heads may be removed from the unit for replacement by merely opening the mold, unbolting bearing plate 23 from plate 24, and withdrawing them. Different jack-screws and mold heads may then be inserted and secured in place by bolting bearing plate 23 back on plate 24.

Located between plate 21 and bearing plate 23 is an actuating plate 29 having follower pins 30 fixedly mounted therein perpendicular to and in cooperation with each of the helices attached to the jack-screws and male molds. Actuating plate 29 is formed of two joined coextensive plates as shown in the drawings. Stripper bolts 29' extend from mounting plate 12 through the vertical tier of plates to actuating plate 29, thereby maintaining the actuating plate 29 in stationary position when the mold is opened and plates 21 through 27 are withdrawn by movable platen 2.

The operation of this apparatus in the manufacture of internally threaded plastic caps is illustrated by the three positions shown in Figs. 2, 3 and 4. In Fig. 2 movable platen 2 is at the forwardmost limit of its stroke, and the male molds are therefore positioned within the female molds defining the mold cavities of the shape of the desired plastic caps. The tier of plates 11, 27, 24 and 23 have been urged into engagement with one another. The heated plastic material is then injected from the heating cylinder through the retractable nozzle 9 and the sprue 13 into the mold cavities through the system of runners and gates. After the plastic in the mold cavities sets around the threaded male molds and the caps are thus formed, the movable platen 2 is withdrawn, thereby moving plates 27, 24, 23 and 21 to the left as seen in the drawing. Actuating plate 29, however, remains stationary and because of the cooperation between helices 19 and the follower pins 30 anchored in the stationary actuating plate, rotary motion is imparted to the male molds 15 and the jack-screws 28. The material which had set in the runners 14 is easily broken at the ends thereof adjacent sprue 13 during this retracting operation, leaving the plurality of caps and the system of runners and gates on the face of restraining plate 27 and protruding male molds 15.

The movable platen 2 and helix-supporting plate 21 are further withdrawn with actuating plate 29 remaining stationary. Since each of the helices 19 and 28' is in threaded engagement with corresponding follower pins 30 fixed in the actuating plate 29, this axial translation of the helices will continue rotation of the helices as they are drawn through the stationary plate 29. The direction of the helices is such that the resultant rotation will tend to unscrew the male molds 15 from their attached caps and will cause jack-screws 28 to unscrew from their sockets 28" in restraining plate 27. Because of the latter, restraining plate 27 will move forwardly relative to plate 24 and the restraining plate will remain in contact with the plastic caps and the system of gates. Hence rotation of the caps is prevented as the male molds are unscrewed therefrom. Retraction of the movable platen is continued until the male molds are entirely unscrewed from the interior of the plastic caps. Then the plurality of caps interconnected by the runners and gates may be manually removed from the machine.

In order to prepare the device for another molding operation, the movable platen is directed horizontally to the right from the position shown in Fig. 4. When this motion starts the actuating plate 29 again remains stationary, and as the helices 19 and 28' progress through the follower pins 30 in the actuating plate, rotation thereof is again effected. However the rotation is now in the opposite direction and the jack-screws are therefore turned into their sockets in restraining plate 27 and the plate is drawn into contact with plate 24. Horizontal movement of the assembly is continued until the restraining plate 27 abuts plate 11 and plate 24 as in the original position shown in Fig. 2.

Various modifications may be made in the preferred embodiment of the apparatus described herein without departure from the scope of the invention. It is particularly obvious, for example, that the number and arrangement of threaded male molds and jack-screws, along with the attached shaft-like members, may be changed. In addition, nuts could be anchored in actuating plate 29 to cooperate with the helices, rather than follower pins as disclosed herein. Therefore, the invention is not limited to the specific embodiment illustrated but rather only to the extent set forth in the appended claims.

I claim:

1. Apparatus for molding internally threaded articles comprising a threaded male mold adapted to cooperate with a stationary female mold and defining therebetween a mold cavity connectable by a gate and sprue system to suitable material injection means, restraining means for preventing rotation of a molded article on the male mold during the unscrewing of the molded article, and actuating means for rotating said male mold and actuating said restraining means; said male mold protruding through a restraining plate and being mounted for rotation and axial translation; said restraining means comprising the restraining plate which is adapted to abut the molded article and through which said male mold protrudes, female screw threads formed in said restraining plate of pitch and direction the same as the threads on said male mold, and a male jack-screw mounted for rotation and axial translation in engagement with said female threads; said actuating means including a shaft-like member for each of said jack-screws and male molds affixed thereto at one end, the other end of each of said shaft-like member being rotatably connected to a movable platen, said shaft-like members having external helical threads of relatively large lead formed on the central sections thereof, an actuating plate through which said helically threaded shaft-like members extend and with which said helical threads cooperate, and means for preventing translation of said actuating plate so that rotation of said shaft-like members is effected when translation of said actuating plate is prevented but translation of said members is continued.

2. Apparatus according to claim 1 incorporating a plurality of male molds, female molds, jack-screws, and shaft-like members.

3. Apparatus according to claim 1 wherein tiers of bearing and supporting plates are positioned between said restraining plate and said actuating plate, and through which said shaft-like members extend.

4. Apparatus for molding internally threaded articles comprising a stationary female mold adapted to cooperate with a male mold, injection means for introducing molding material into a cavity defined therebetween, said male mold having associated therewith a shaft-like member having helical threads of relatively large lead thereon adapted to cause rotation of said male mold in response to retraction of said male mold, means for retracting said male mold and a molded article thereon, and a restraining plate maintained in abutment with said article, said restraining plate being supported by an axially retractable and translatable second shaft-like member having helical threads of relatively large lead thereon, said shaft-like member being connected to said restraining plate by a threaded jack screw having threads of pitch and direction equal to the internal threads on the article, and a stationary actuating plate through which said shaft-like members extend and with which said helical threads cooperate, whereby said stationary actuating plate effects rotation of said male mold and said jack screw and maintains abutment between said restraining plate and said article and effects unscrewing of the male mold from said article.

5. Apparatus according to claim 4 incorporating a plurality of male and female molds and a plurality of jack screws.

6. Apparatus for molding internally threaded articles comprising a stationary female mold adapted to cooperate with a movable male mold, injection means for introducing a molding material into a cavity defined therebetween, said male mold having associated therewith a first shaft-like member having helical threads of relatively large lead adapted to cause rotation of said male mold in response to retraction of said male mold, means for retracting said male mold and a molded article thereon, restraining means maintained in abutment with said article, said restraining means being associated with a shaft-like member having helical threads formed thereon matching the helical threads upon said first shaft-like member, said second shaft-like member being connected to said restraining means by a jack screw having threads of pitch and direction equal to the internal threads on the article, and a common actuating means for said first and second shaft-like members responsive to retraction of said male mold to effect rotation of said male mold and said jack screw.

7. Apparatus according to claim 6 in which the first and second shaft-like members are axially translatable with said male mold and said actuating means comprises a stationary actuating plate through which said shaft-like members extend and with which said helical threads cooperate to rotate said male mold and said jack screw upon retraction of said male mold.

8. Apparatus according to claim 7 wherein said shaft-like members are rotatably mounted on a movable platen and are axially movable thereby.

9. Apparatus according to claim 8 incorporating a plurality of said molds and shaft-like members.

References Cited in the file of this patent

UNITED STATES PATENTS

| | | |
|---|---|---|
| 1,698,120 | Berry | Jan. 8, 1929 |
| 1,969,511 | Herre et al. | Aug. 7, 1934 |
| 2,363,808 | Sayre | Nov. 28, 1944 |
| 2,558,027 | Wilson | June 26, 1951 |

FOREIGN PATENTS

| | | |
|---|---|---|
| 696,643 | Germany | Sept. 26, 1940 |